United States Patent
Venkat et al.

(10) Patent No.: US 9,639,629 B1
(45) Date of Patent: May 2, 2017

(54) ACCELERATING THE DOWNLOADING OF CONTENT TO AN APPLICATION

(75) Inventors: Raghu Venkat, Palo Alto, CA (US); Hariharan Kolam, Palo Alto, CA (US); Manav Ratan Mital, San Carlos, CA (US)

(73) Assignee: Instart Logic, Inc., Palo Alto, CA (US)

(*) Notice: Subject to any disclaimer, the term of this patent is extended or adjusted under 35 U.S.C. 154(b) by 672 days.

(21) Appl. No.: 13/222,968

(22) Filed: Aug. 31, 2011

(51) Int. Cl.
  *G06F 15/16* (2006.01)
  *G06F 17/30* (2006.01)
  *H04L 29/06* (2006.01)
  *H04L 29/08* (2006.01)

(52) U.S. Cl.
  CPC ...... *G06F 17/30908* (2013.01); *H04L 65/105* (2013.01); *H04L 67/2847* (2013.01)

(58) Field of Classification Search
  CPC ............. G06F 17/30902; H04L 65/105; H04L 67/2847
  USPC .......................................................... 709/219
  See application file for complete search history.

(56) References Cited

U.S. PATENT DOCUMENTS

| | | | |
|---|---|---|---|
| 6,907,022 B2* | 6/2005 | Dorenbosch | 370/338 |
| 7,941,609 B2* | 5/2011 | Almog | 711/137 |
| 7,953,820 B2* | 5/2011 | Stevens et al. | 709/219 |
| 2005/0165828 A1* | 7/2005 | Lango et al. | 707/102 |
| 2011/0015917 A1* | 1/2011 | Wang et al. | 703/23 |
| 2011/0307238 A1* | 12/2011 | Scoda | G06F 17/30905 703/26 |
| 2012/0166665 A1* | 6/2012 | Martin | 709/230 |
| 2012/0192080 A1* | 7/2012 | Lloyd | 715/744 |
| 2012/0265802 A1* | 10/2012 | Shen et al. | 709/203 |
| 2012/0295607 A1* | 11/2012 | Tyhurst et al. | 455/422.1 |
| 2013/0013673 A1* | 1/2013 | Ahmed et al. | 709/203 |
| 2013/0047123 A1* | 2/2013 | May et al. | 715/834 |

\* cited by examiner

*Primary Examiner* — Bryan Lee
(74) *Attorney, Agent, or Firm* — Van Pelt, Yi & James LLP

(57) ABSTRACT

A method of delivering content to a device is disclosed. The method includes receiving a request by a proxy server, wherein the request is received by a local client and transferred by the local client to the proxy server, and wherein the request comprises a request for content available at a content server sent from an application to the content server. The method further includes parsing the content and identifying a task associated with the content by the proxy server. The method further includes delivering the content and information associated with the identified task from the proxy server to the local client, wherein the content is further delivered from the local client to the application.

47 Claims, 4 Drawing Sheets

```
<html>
  <head>
    <title>Welcome</title>
  </head>
  <body>
    <h1>HelloWorld </h1>
         .
         .
         .
    <img src = "url for image"/>
    <video>
        <source src = "url for video" type = "video/ogg"  />
    </video>

</body>
</html>
```

Dependent Resources

FIG. 2

ACCELERATING THE DOWNLOADING OF CONTENT TO AN APPLICATION

BACKGROUND OF THE INVENTION

Some computer applications need to download one or more resources from a content server. Some of these resources may be separately requested, received, and processed. Accordingly, the latency associated with downloading these resources can be significant. Therefore, improved techniques for downloading the resources for these applications would be desirable.

BRIEF DESCRIPTION OF THE DRAWINGS

Various embodiments of the invention are disclosed in the following detailed description and the accompanying drawings.

FIG. 2 is a diagram illustrating an embodiment of a webpage described by HTML.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
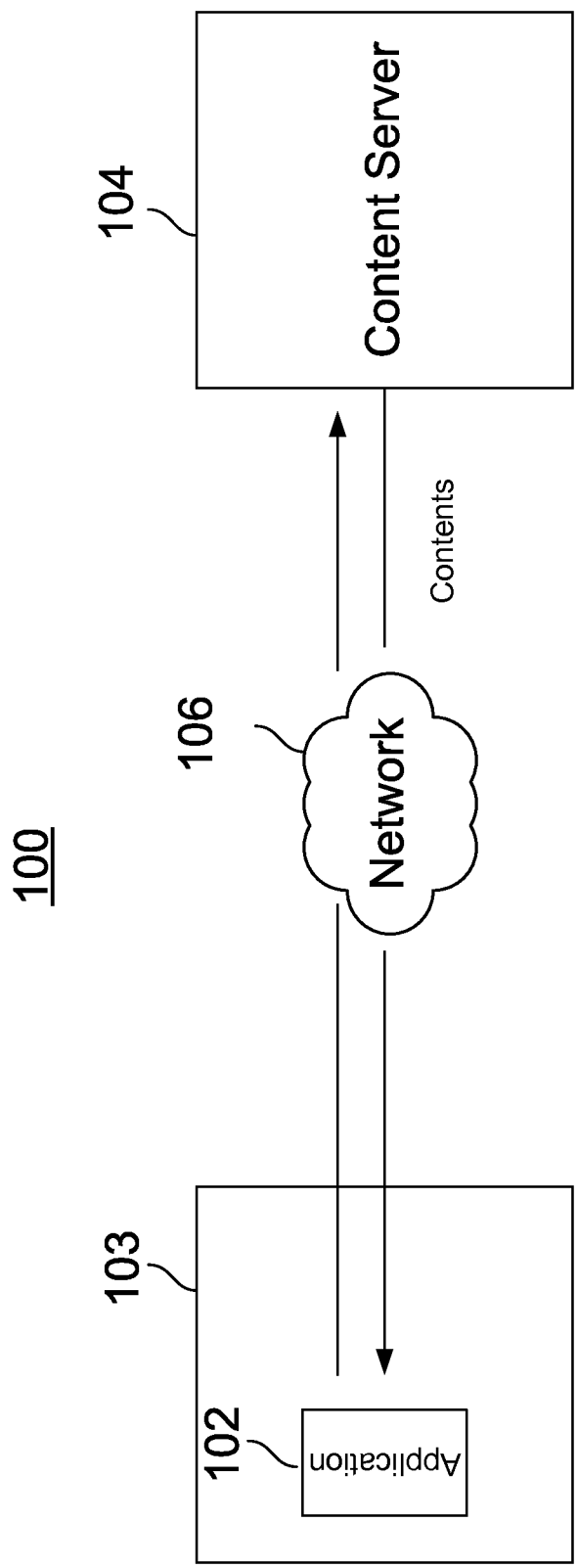
FIG. 1 is a block diagram illustrating an embodiment of a communication 100 between an application and a content server for the application to access content on the content server.

FIG. 1 is a block diagram illustrating an embodiment of a communication 100 between an application and a content server for the application to access content on the content server. As shown in FIG. 1, an application 102 running on a device 103 is connected to a content server 104 through a network 106. However, any number of applications and content servers may be connected through network 106. Network 106 may be a combination of public or private networks, including intranets, LANs, WANs, and the Internet.

In some embodiments, communication 100 is initiated when application 102 is executed on device 103 and is accessing content on content server 104. In some embodiments, device 103 on which application 102 is run may be a mobile phone, a personal digital assistant (PDA), a tablet personal computer, a desktop computer, and the like. In some embodiments, application 102 is downloading Small Web Format (SWF) files from content server 104. In some embodiments, application 102 is a web browser, and communication 100 is initiated when the web browser is accessing a webpage. The webpage may be described by different markup languages, including Hypertext Markup Language (HTML), Extensible Markup Language (XML), and the like. The webpage may also be described by different scripting languages, including JavaScript Object Notation (JSON), and the like. HTML is used hereinafter as an example of the various languages for describing webpages, and a web browser is used hereinafter as an example for application 102 described above. Note that the examples of HTML and a web browser are selected for illustration purposes only; accordingly, the present application is not limited to these specific examples only.

FIG. 2 is a diagram illustrating an embodiment of a webpage described by HTML. To display the webpage, web browser 102 in FIG. 1 sends a Hypertext Transfer Protocol (HTTP) request message to content server 104 requesting for the HTML webpage. After content server 104 locates the requested HTML webpage, content server 104 returns the requested HTML webpage in an HTTP response message to web browser 102. Web browser 102 parses the received webpage and begins to render a portion of the webpage, e.g., a text portion, on device 103. Note that the example of HTTP is selected for illustration purposes only; accordingly the present application is not limited to this specific example only.

As shown in FIG. 2, the webpage may include a plurality of dependent resources other than text. For example, the dependent resources may include images, videos, audio clips, uniform resource locator (URL) links, and the like. These dependent resources are resources that need to be separately transferred from content server 104 or from other servers to web browser 102. For example, as shown in FIG. 2, the list of dependent resources includes an image, which is stored at a location specified by an URL. To display the image on the webpage, web browser 102 sends a separate HTTP request message to the URL, and the image will be returned in a separate HTTP response message from the URL. Because the webpage may contain many dependent resources, and each dependent resource needs to be separately requested, received, and processed, the latency associated with obtaining these dependent resources can become significant. In particular, HTTP uses Transmission Control Protocol (TCP) as a transport layer. Each HTTP request opens a new TCP connection, thus increasing the latency associated with TCP connection setup and slow-start procedures. Therefore, a technique to speed up the downloading of content from a content server to an application would be desirable.

Figure 3:
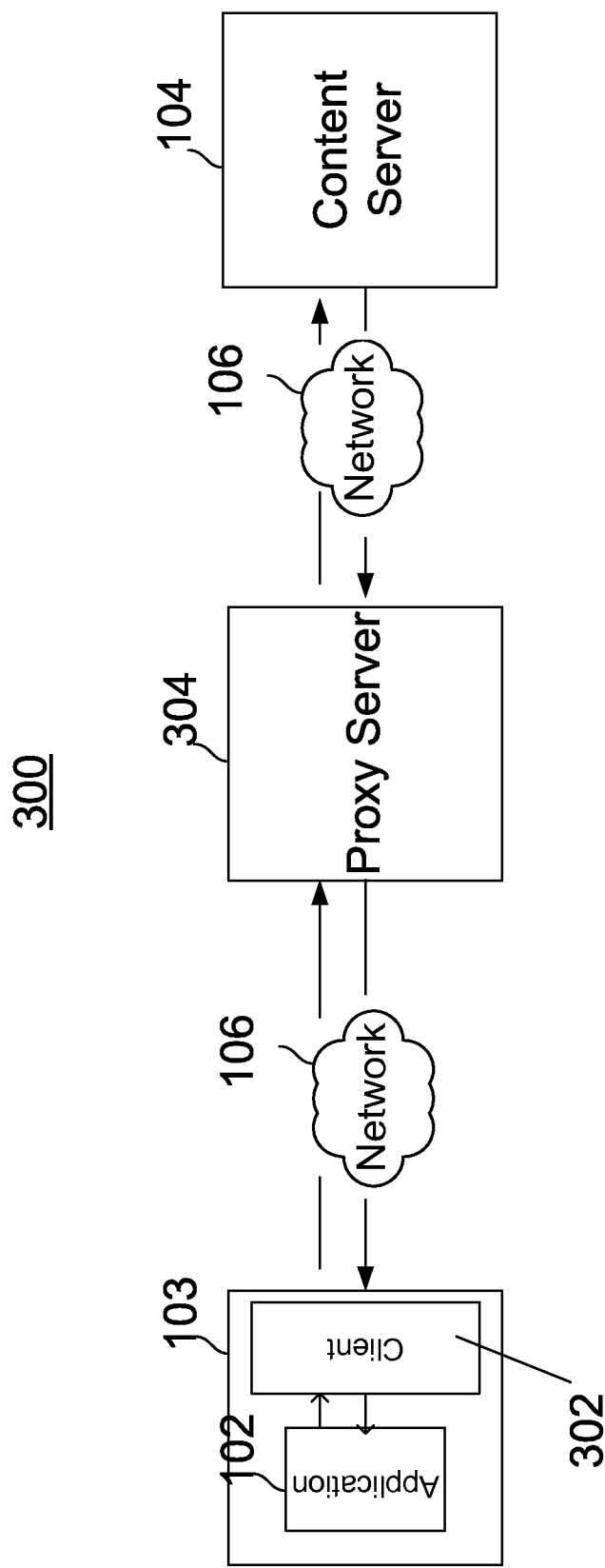
FIG. 3 is a block diagram illustrating an embodiment of a communication 300 between an application and a content server for the application to access content on the content server.

FIG. 3 is a block diagram illustrating an embodiment of a communication 300 between an application and a content server for the application to access content on the content server. Continuing with the HTML webpage illustrative example above, a client 302 is installed on device 103. When web browser 102 sends an HTTP request message to content server 104 requesting for the HTML webpage, client 302 intercepts the HTTP request message. In some embodiments, the interception of the HTTP request message by client 302 is kept transparent to web browser 102.

After client 302 intercepts the HTTP request message, it does not send a request for the HTML webpage directly to content server 104. Instead, client 302 sends a request for the HTML webpage to a proxy server 304. In some embodiments, proxy server 304 is a server that belongs to a content delivery network or content distribution network (CDN). In some embodiments, the request sent by client 302 to proxy server 304 is sent with a protocol other than HTTP.

Proxy server 304 has access to the HTML webpage which is hosted by content server 104. In some embodiments, proxy server 304 periodically obtains the most updated version of the HTML webpage from content server 104. The most updated version may be stored in a cache on proxy server 304. In some other embodiments, proxy server 304 may send a request for the HTML webpage to content server 104 on demand. For example, proxy server 304 may send an HTTP request message to content server 104 after proxy server 304 receives a request from client 302 for the HTML webpage and after proxy server 304 has determined that the requested HTML webpage is not available from the cache on proxy server 304. In response, content server 104 may return the requested HTML webpage in an HTTP response message to proxy server 304.

With access to the HTML webpage, proxy server 304 may parse the HTML webpage and identify one or more dependent resources that are associated with the HTML webpage. In some embodiments, proxy server 304 sends a copy of the HTML webpage first, parses the HTML webpage, and then sends the information of the list of dependent resources to client 302. In some other embodiments, proxy server 304 waits until the list of dependent resources are identified before it sends the HTML webpage and the information of the list of dependent resources to client 302.

When client 302 receives the information of the list of dependent resources from proxy server 304, client 302 may check whether each of the dependent resources is already stored in a local cache on device 103. If a dependent resource is not already stored in the local cache, or if the dependent resource is a stale version, client 302 may send a request for the resource to proxy server 304. In some embodiments, a hashed signature may be used by client 302 and proxy server 304 for determining whether a dependent resource stored in the cache is the most current version or not. For example, the information of the list of dependent resources sent by proxy server 304 to client 302 may include a hashed signature for each dependent resource on the list. Client 302 may compare the received hashed signature with the hashed signature of its own copy in the local cache. If they are different, then client 302 has a stale version and may send a request to proxy server 304 for the newer version. In some embodiments, proxy server 304 sends a delta, or difference, between the newer version and client 302's older version. In some embodiments, proxy server 304 sends the entire resource to client 302 again.

While client 302 is handling the information of the list of dependent resources, client 302 may send the HTML webpage to web browser 102 using an HTTP response message. When web browser 102 receives the HTML webpage, web browser 102 parses the received HTML webpage and begins to render the webpage on device 103. When web browser 102 identifies a resource listed on the HTML webpage that needs to be separately requested (for example, an image), web browser 102 sends a separate HTTP request message to the URL where the resource may be downloaded. This HTTP request message is again intercepted by client 302.

When client 302 intercepts the HTTP request message for the dependent resource, client 302 can send the resource immediately to web browser 302 in a HTTP response message if a current version of the resource is already stored in the local cache on device 103. If the resource is not available in the local cache, then client 302 must have already requested for the resource as described above and is waiting for the resource to be returned. In this case, as soon as the resource is received by client 302, the resource can be sent to web browser 302.

Distributing content as described above has a number of advantages. When web browser 302 sends a request for a dependent resource, client 302 can check the local cache on device 103 first. If the dependent resource is already in the local cache, client 302 can return the resource to web browser 302 immediately, and no new TCP connection is opened. If the dependent resource is not in the local cache, then because the list of dependent resources has been identified ahead of time by proxy server 304 and sent to client 302, client 302 is able to start sending a request for the resource while web browser 102 is still parsing the webpage and before web browser 102 can send a request for the resource, thereby reducing the latency associated with the downloading of the dependent resources to device 103.

In addition, because client 302 may send requests to and receive responses from proxy server 304 using a protocol other than HTTP, client 302 does not need to open a new TCP connection for each HTTP request. Instead, client 302 may maintain one or more persistent TCP connections with proxy server 304. This will reduce the latency associated with TCP connection setup and slow start procedures. Similarly, proxy server 304 may maintain one or more persistent TCP connections with content server 104. For example, if proxy server 304 is connected to content server 104 on a backbone infrastructure of the Internet, proxy server 304 can afford to keep the connections open for extended period of time. Furthermore, parsing of the HTML webpage can be performed more efficiently by proxy server 304 because of its high computation power.

Figure 4:
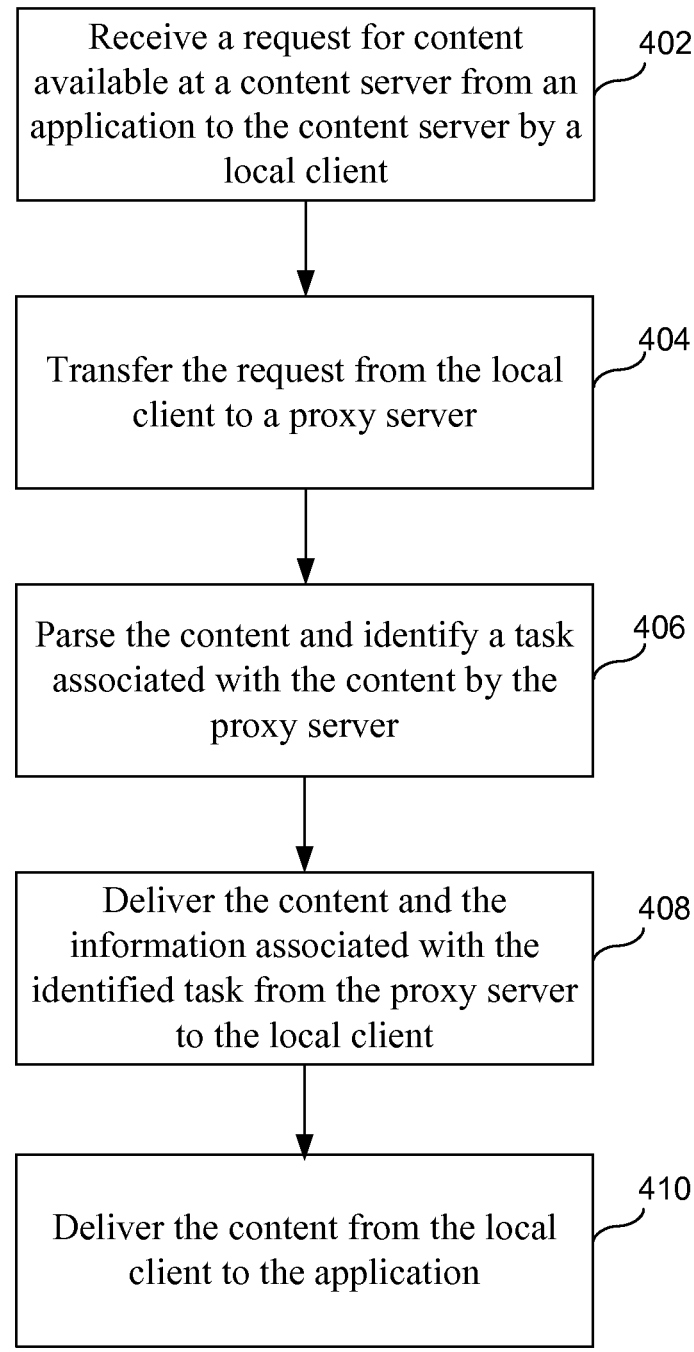
FIG. 4 is a diagram illustrating an embodiment of a process 400 for delivering content to a device.

FIG. 4 is a diagram illustrating an embodiment of a process 400 for delivering content to a device. In some embodiments, process 400 may be used to set up communication 300 as shown in FIG. 3. At 402, a request for content available at a content server from an application to the content server is received by a local client, which is installed on the device on which the application is running. For example, the application may send a request to content server requesting for the content, and the client intercepts the request. In some embodiments, the interception of the request by the client is kept transparent to the application.

At 404, the request is transferred from the local client to a proxy server. For example, after the client intercepts the request, the client does not send the request directly to the content server, but redirects the request to a proxy server. In some embodiments, the proxy server is a server that belongs to a CDN. In some embodiments, the request sent by the client to the proxy server is sent with a protocol other than the original protocol that is used by the application for sending a request to the content server.

The proxy server has access to the content that is hosted by the content server. The proxy server obtains a version of the content either by periodically polling the content server or by requesting the content from the content server on demand. The content obtained may be stored in a cache on the proxy server.

At 406, the content is parsed and a task associated with the content is identified by the proxy server. In some embodiments, the content is an HTML webpage. The proxy server parses the HTML webpage and identifies that the webpage requires the web browser to request for one or more dependent resources, e.g., images, from different URLs.

At 408, the content and the information associated with the identified task are delivered from the proxy server to the local client. For example, if the content is a HTML webpage, the proxy server may deliver the HTML webpage and the information of a list of dependent resources associated with the HTML webpage to the local client.

When the client receives the information of the list of dependent resources from the proxy server, the client may check whether each of the dependent resources is already stored in a local cache. If a dependent resource is not already stored in the local cache, or if the dependent resource is a stale version, the client may send a request for the resource to the proxy server. In some embodiments, a hashed signature may be used by the client and the proxy server for determining whether a dependent resource stored in the cache is the most current version or not.

At 410, the content is delivered from the local client to the application. For example, the client may send the HTML webpage to the web browser using an HTTP response message. When the web browser receives the HTML webpage, the web browser parses the received HTML webpage and begins to render the webpage on the device. When the web browser identifies a resource listed on the HTML webpage that needs to be separated requested (for example, an image), the web browser sends a separate HTTP request message to the URL where the resource may be downloaded. This HTTP request message is again intercepted by the client 302.

When the client intercepts the HTTP request message for the dependent resource, the client can send the resource immediately to the web browser in a HTTP response message if a current version of the resource is already stored in the local cache on the device. If the resource is not available in the local cache, the client must have already requested for the resource and is waiting for the resource to be returned. In this case, as soon as the resource is received by the client, the resource can be sent to the web browser.

With continuing reference to FIG. 3, in some embodiments, transcoding can be used to adjust the resolution or size of images or videos that are received or displayed by device 103. In some embodiments, transcoding can be used to adjust the quality of audio clips that are received or played back by device 103. In some embodiments, client 302 or proxy server 304 may transcode a dependent resource before the resource is delivered to application 102. For example, either proxy server 304 or client 302 may transcode a dependent resource, e.g., an image, before it is delivered to application 102. The transcoding may be determined based on the processing power of device 103, the screen size of device 103, and/or whether device 103 is a mobile device with limited bandwidth or not.

In some embodiments, proxy server 304 may compress the content or the dependent resources before they are sent to client 103, and client 103 may decompress the content or the dependent resources before they are sent to application 102. For example, a bitmap image file may be compressed by proxy server 303 to a JPEG image file.

In some embodiments, proxy server 304 executes a JavaScript embedded in a HTML webpage and integrates the HTML webpage with the result of the JavaScript before a modified HTML webpage is sent to client 302. For example, a JavaScript for displaying an advertisement on a webpage is embedded in an HTML file for the webpage. The JavaScript can be executed by proxy server 304 to generate the advertisement icon or image, which can be integrated with the HTML file before a modified HTML file is sent to client 302. Proxy server 304 often has higher computation power than device 103, thus reducing the time for rendering the HTML webpage on device 103 by application 102.

In some embodiments, the Domain Name System (DNS) response time can be reduced by sending a dummy DNS response message. As shown in FIG. 3, client 302 redirects a request for an HTML webpage to proxy server 304. Since client 302 does not need to establish a connection with content server 104, a DNS request for an IP address of content server 104 can be intercepted by client 302, and client 302 may send a dummy DNS response message in response, thereby reducing the DNS response time.

In some embodiments, the identified task at step 406 of process 400 is a task that is executed after a user clicks on something, e.g., an image icon, on a webpage or on an application screen. For example, an e-commerce webpage may include one or more image icons for different products. The images of these products are not displayed until the user clicks on their corresponding image icons. In some embodiments, the images of these products can be prefetched by client 302. For example, proxy server 304 may send information regarding a list of image icons on the webpage, and client 302 may prefetch the images corresponding to these image icons ahead of time. In some embodiments, the order in which the images are prefetched is based on the workflow information provided by the webpage developer. For example, if one image is likely to be clicked by a user earlier than other images based on the workflow information, then the image may be prefetched first.

Client 302 can be installed on device 103 in different ways. In some embodiments, client 302 is installed as part of the firmware running on device 103. Since all the applications or web browsers are serviced by the firmware, client 302 can be used to speed up the downloading of content from a content server to each of these applications or web browsers. In some embodiments, client 302 is installed as part of application 102. For example, a software development kit (SDK) may be used to integrate client 302 with application 102. In some embodiments, client 302 may run on device 103 by embedding a piece of JavaScript or ActionScript code (e.g., Ajax code) on the webpage. When the web browser executes the piece of Ajax code on the webpage, client 302 starts to run and client 302 may intercept the HTTP requests by the web browser and communicate with the proxy server as described in process 400 above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of delivering content to a device, comprising:
receiving a request by a proxy server, wherein the request is received by a local client and transferred by the local client to the proxy server, and wherein the request comprises a request for content available at a content server, and wherein the request is sent from an application to the content server, and wherein the local client comprises a client running locally on the device on which the application runs;
parsing the content and identifying a plurality of dependent resources by the proxy server, wherein each of the dependent resources is identified as going to be requested by the application to be sent from a location to the application, and wherein the location is remote from the device on which the application runs;
delivering the content from the proxy server to the local client, wherein the content is further delivered from the local client to the application; and
prior to receiving a request for the plurality of dependent resources, delivering information associated with the plurality of dependent resources but not the dependent resources from the proxy server to the local client, wherein the information associated with the plurality of dependent resources comprises hashed signatures of the plurality of dependent resources, wherein the local client determines whether to send a request for one of the plurality of dependent resources based on the hashed signature of the one of the plurality of dependent resources.

2. The method of claim 1, wherein the application comprises a web browser.

3. The method of claim 1, further comprising transferring the request from the proxy server to the content server.

4. The method of claim 1, further comprising receiving the content from the content server by the proxy server and storing the content in a cache on the proxy server.

5. The method of claim 1, wherein the content comprises a Hypertext Markup Language (HTML) file.

6. The method of claim 1, wherein each of the resources comprises one of the following: an image, a video clip, and an audio clip.

7. The method of claim 1, further comprising receiving a request for one of the dependent resources to be sent to the local client, wherein the request for the one of the dependent resources is received by the proxy server and sent by the local client, and wherein the request by the local client for the one of the dependent resources is performed after the information associated with the plurality of dependent resources is received by the local client, and wherein the request by the local client for the one of the dependent resources is performed prior to the requesting by the application for the one of the dependent resources to be sent to the application is performed.

8. The method of claim 7, wherein the request by the local client for the one of the dependent resources is performed in the event that the resource is not available in a local cache.

9. The method of claim 7, wherein the request by the local client for the one of the dependent resources is performed in the event that a latest version of the one of the dependent resources is not available in a local cache based on a hashed signature comparison.

10. The method of claim 7, wherein a priority associated with the request by the local client for the one of the dependent resources is based on workflow information.

11. The method of claim 7, further comprising delivering the one of the dependent resources to the local client by the proxy server in response to the request by the local client for the one of the dependent resources to be sent to the local client.

12. The method of claim 11, wherein delivering the one of the dependent resources to the local client by the proxy server comprises compressing the one of the dependent resources.

13. The method of claim 11, wherein delivering the one of the dependent resources to the local client by the proxy server comprises encoding the one of the dependent resources.

14. The method of claim 1, wherein the requesting by the application for the one of the dependent resources is intercepted by the local client, and wherein the one of the dependent resources is delivered from the local client to the application.

15. The method of claim 14, wherein the delivered dependent resource from the local client to the application comprises a transcoded resource.

16. The method of claim 1, wherein the request for the content sent from the application is received by the client by intercepting the request.

17. The method of claim 1, wherein the received request for the content is sent by the application using a first protocol and the transferred request is sent by the local client using a second protocol, wherein the first protocol and the second protocol are different.

18. The method of claim 17, wherein the first protocol is Hypertext Transfer Protocol (HTTP).

19. The method of claim 1, wherein a persistent TCP connection is maintained between the local client and the proxy server for transferring the request from the local client to the proxy server.

20. The method of claim 1, wherein a DNS request for an IP address of the content server is intercepted by the local client, and wherein a dummy DNS response is sent by the local client.

21. The method of claim 1, wherein the local client is installed in a firmware of the device on which the application runs.

22. The method of claim 1, wherein the local client is installed as part of the application.

23. The method of claim 1, wherein the local client runs on the device on which the application runs by executing a JavaScript or an ActionScript code embedded in the content.

24. A proxy server for delivering content to a device, comprising:
a processor configured to:
receive a request, wherein the request is received by a local client and transferred by the local client to the proxy server, and wherein the request comprises a request for content available at a content server, and wherein the request is sent from an application to the content server, and wherein the local client comprises a client running locally on the device on which the application runs;
parse the content and identify a plurality of dependent resources, wherein each of the dependent resources is identified as going to be requested by the application to be sent from a location to the application, and wherein the location is remote from the device on which the application runs;
deliver the content from the proxy server to the local client, wherein the content is further delivered from the local client to the application; and
prior to receiving a request for the plurality of dependent resources, deliver information associated with the plurality of dependent resources but not the dependent resources from the proxy server to the local client, wherein the information associated with the plurality of dependent resources comprises hashed signatures of the plurality of dependent resources, wherein the local client determines whether to send a request for one of the plurality of dependent resources based on the hashed signature of the one of the plurality of dependent resources; and a memory coupled to the processor and configured to provide the processor with instructions.

25. The proxy server of claim 24, wherein the application comprises a web browser.

26. The proxy server of claim 24, wherein the processor is further configured to transfer the request from the proxy server to the content server.

27. The proxy server of claim 24, wherein the processor is further configured to receive the content from the content server and store the content in a cache on the proxy server.

28. The proxy server of claim 24, wherein the content comprises a Hypertext Markup Language (HTML) file.

29. The proxy server of claim 24, wherein each of the resources comprises one of the following: an image, a video clip, and an audio clip.

30. The proxy server of claim 24, wherein the processor is further configured to receive a request for one of the dependent resources to be sent to the local client, wherein the request for the one of the dependent resources is sent by the local client, and wherein the request by the local client for the one of the dependent resources is performed after the information associated with the plurality of dependent resources is received by the local client, and wherein the request by the local client for the one of the dependent resources is performed prior to the requesting by the application for the one of the dependent resources to be sent to the application is performed.

31. The proxy server of claim 30, wherein the request by the local client for the one of the dependent resources is performed in the event that the resource is not available in a local cache.

32. The proxy server of claim 30, wherein the request by the local client for the one of the dependent resources is performed in the event that a latest version of the one of the dependent resources is not available in a local cache based on a hashed signature comparison.

33. The proxy server of claim 30, wherein a priority associated with the request by the local client for the one of the dependent resources is based on workflow information.

34. The proxy server of claim 30, wherein the processor is further configured to deliver the one of the dependent resources to the local client in response to the request by the local client for the one of the dependent resources to be sent to the local client.

35. The proxy server of claim 34, wherein delivering the one of the dependent resources to the local client by the proxy server comprises compressing the one of the dependent resources.

36. The proxy server of claim 24, wherein the requesting by the application for the one of the dependent resources is intercepted by the local client, and wherein the one of the dependent resources is delivered from the local client to the application.

37. The proxy server of claim 36, wherein the delivered dependent resource from the local client to the application comprises a transcoded resource.

38. The proxy server of claim 24, wherein the request for the content sent from the application is received by the client by intercepting the request.

39. The proxy server of claim 24, wherein the received request for the content is sent by the application using a first protocol and the transferred request is sent by the local client using a second protocol, wherein the first protocol and the second protocol are different.

40. The proxy server of claim 39, wherein the first protocol is Hypertext Transfer Protocol (HTTP).

41. The proxy server of claim 24, wherein a persistent TCP connection is maintained between the local client and the proxy server for transferring the request from the local client to the proxy server.

42. The proxy server of claim 24, wherein a DNS request for an IP address of the content server is intercepted by the local client, and where a dummy DNS response is sent by the local client.

43. The proxy server of claim 24, wherein the local client is installed in a firmware of the device on which the application runs.

44. The proxy server of claim 24, wherein the local client is installed in the application.

45. The proxy server of claim 24, wherein the local client runs on the device on which the application runs by executing a JavaScript or an ActionScript code embedded in the content.

46. A local client for delivering content to a device, comprising:

a processor configured to:
  receive a request for content available at a content server from an application to the content server;
  transfer the request from the local client to a proxy server, wherein the content is parsed by the proxy server, and wherein a plurality of dependent resources is identified by the proxy server, wherein each of the dependent resources is identified as going to be requested by the application to be sent from a location to the application, and wherein the location is remote from the device on which the application runs;
  receive the content from the proxy server;
  prior to sending requests for the plurality of dependent resources, receive information associated with the plurality of dependent resources but not the dependent resources from the proxy server, wherein the information associated with the plurality of dependent resources comprises hashed signatures of the plurality of dependent resources, determine whether to send a request for one of the plurality of dependent resources based on the hashed signature of the one of the plurality of dependent resources; and
  deliver the content from the local client to the application, wherein the local client runs locally on the device on which the application runs; and a memory coupled to the processor and configured to provide the processor with instructions.

47. A computer program product for delivering content to a device, the computer program product being embodied in a non-transitory computer readable storage medium and comprising computer instructions for:

receiving a request by a proxy server, wherein the request is received by a local client and transferred by the local client to the proxy server, and wherein the request comprises a request for content available at a content server, wherein the request is sent from an application to the content server, and wherein the local client comprises a client running locally on the device on which the application runs;

parsing the content and identifying a plurality of dependent resources by the proxy server, wherein each of the dependent resources is identified as going to be requested by the application to be sent from a location to the application, and wherein the location is remote from the device on which the application runs;

delivering the content from the proxy server to the local client, wherein the content is further delivered from the local client to the application; and prior to receiving a request for the plurality of dependent resources, delivering information associated with the plurality of dependent resources but not the plurality of dependent resources from the proxy server to the local client, wherein the information associated with the plurality of dependent resources comprises hashed signatures of the plurality of dependent resources, wherein the local client determines whether to send a request for one of the plurality of dependent resources based on the hashed signature of the one of the plurality of dependent resources.

* * * * *